United States Patent
Lindsey

(10) Patent No.: US 8,256,982 B2
(45) Date of Patent: Sep. 4, 2012

(54) THIMBLE WITH ELEMENT RETAINING FEATURE

(75) Inventor: Mike Lindsey, Lafayette, LA (US)

(73) Assignee: Delta Rigging & Tools, Inc., Lake Jackson, TX (US)

( * ) Notice: Subject to any disclaimer, the term of this patent is extended or adjusted under 35 U.S.C. 154(b) by 0 days.

(21) Appl. No.: 13/233,504

(22) Filed: Sep. 15, 2011

(65) Prior Publication Data
US 2012/0003033 A1 Jan. 5, 2012

(51) Int. Cl.
*F16G 11/00* (2006.01)
(52) U.S. Cl. .......................................... 403/210; 294/74
(58) Field of Classification Search .................. 403/209, 403/210; 294/74, 82.11
See application file for complete search history.

(56) References Cited

U.S. PATENT DOCUMENTS

| | | | |
|---|---|---|---|
| 139,230 A | 5/1873 | Bell | |
| 857,717 A | 6/1907 | Brown | |
| 1,300,794 A | 4/1919 | Wendt-Wriedt | |
| 1,836,744 A * | 12/1931 | Bankwitz | 403/210 |
| 3,083,991 A * | 4/1963 | Gale | 403/210 |
| 3,656,293 A | 4/1972 | Lowery, Sr. | |
| 3,915,487 A * | 10/1975 | Zeiler | 294/82.11 |
| 4,215,463 A | 8/1980 | Crook | |
| 4,225,172 A * | 9/1980 | Marquardt | 294/74 |
| 4,561,154 A * | 12/1985 | Briscoe et al. | 24/136 K |
| 5,647,198 A | 7/1997 | Mihailovic | |
| 5,711,243 A * | 1/1998 | Dunham | 114/230.2 |
| 6,120,074 A | 9/2000 | Hamrick | |
| 6,282,879 B1 | 9/2001 | Bonaiti et al. | |

FOREIGN PATENT DOCUMENTS

| | | |
|---|---|---|
| JP | 63-197275 | 12/1988 |
| JP | 2001-240361 | 9/2001 |

OTHER PUBLICATIONS

Wire Thimble—Stainless Steel, http://www.entship.ca/Default.aspx?tabid=620 (last visited Nov. 2, 2009).
DIN 3091 Ductile Iron Thimble,Made by Toolee, http://www.riggingliftingsling.com/Rigging/Thimble/DIN-3091-Ductile-564.html (last visited Nov. 2, 2009).
Tubular-Tube Thimble with guesset, http://www.riggingliftingsling.com/Rigging/Thimble/Tubular-Tube-Thi-554.html (last visited Nov. 2, 2009).
Tubular-Tube Thimble with Gusset Type2, Welded, http://ww.rigginglifting.com/Wire-Ropes-and-Fittings/Wire-rope-Thimble/Tubular-Tube-Thi-660.html (last visited Nov. 2, 2009).
International Search Report, PCT/US2010/047330, filed Aug. 31, 2010, 3pp. (Jun. 1, 2011).
Written Opinion, PCT/US2010/047330, filed Aug. 31, 2010, 4pp. (Jun. 1, 2011).
Wire Rope Thimbles, S-412, Solid Wire Rope Thimbles, p. 143 (2011).
International Preliminary Report on Patentability, PCT/US2010/047330, filed Aug. 31, 2010, 5pp. (Mar. 6, 2012).

* cited by examiner

*Primary Examiner* — Daniel P. Stodola
*Assistant Examiner* — Jonathan Masinick
(74) *Attorney, Agent, or Firm* — Klarquist Sparkman, LLP

(57) ABSTRACT

A captivated wire rope assembly can comprise a wire rope, shackle, ferrule, and wire rope thimble having an element retaining feature. The element retaining feature can ensure that all of the assembly components remain together for the life of the assembly by rendering it impossible to remove or replace the shackle or other rigging element without apparent damage to the system. The element retaining feature can be, for example, a substantially triangular gusset welded to one thimble leg, but not the other. Disclosed methods for making such a captivated wire rope assembly require no welding after the wire rope has been placed in the thimble, thus preventing damage to the wire rope or other assembly components.

10 Claims, 6 Drawing Sheets

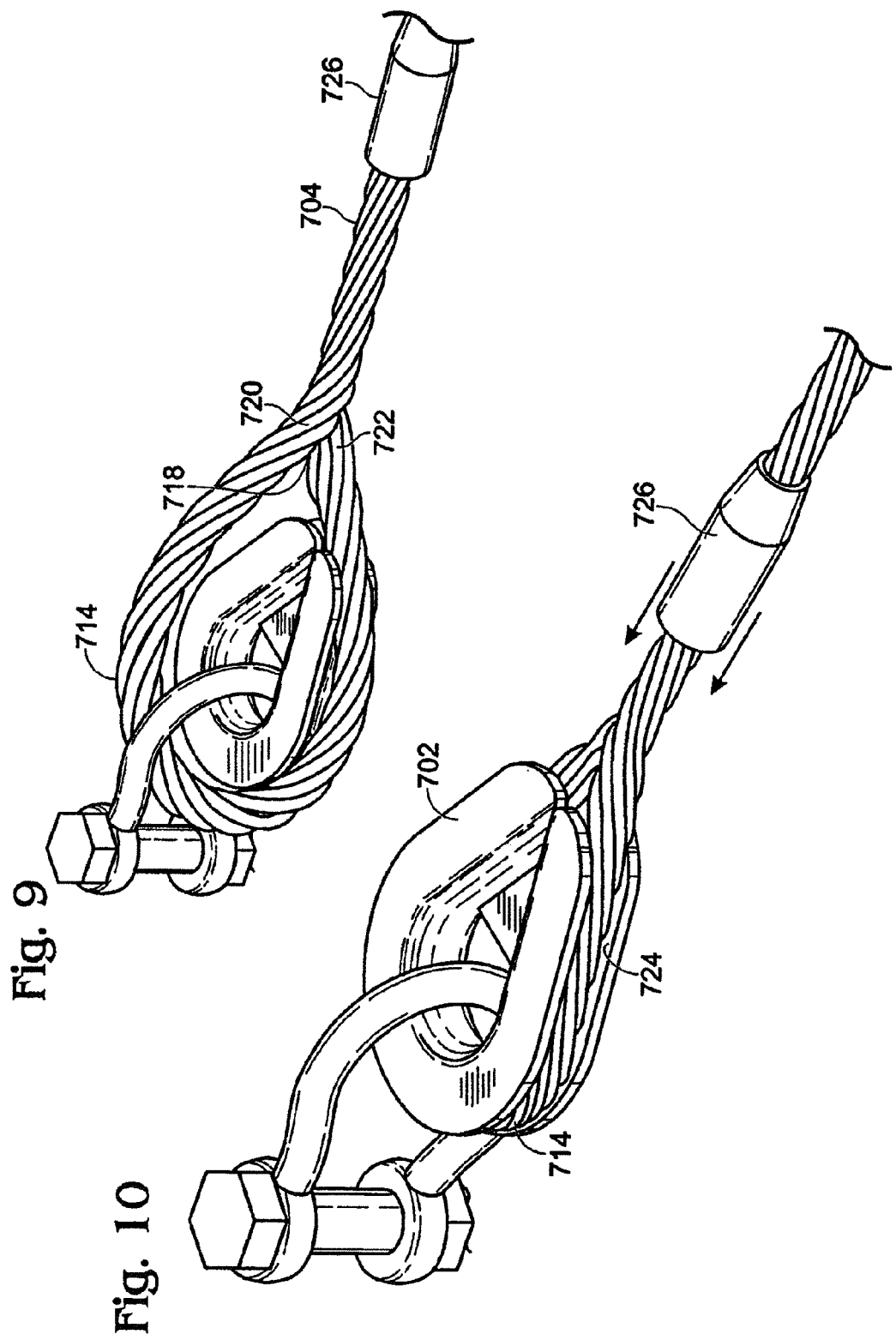

THIMBLE WITH ELEMENT RETAINING FEATURE

CROSS REFERENCE TO RELATED APPLICATION

Priority is claimed to U.S. patent application Ser. No. 12/584,225, filed Sep. 1, 2009, entitled THIMBLE WITH ELEMENT RETAINING FEATURE, by Mike Lindsey, and to PCT/US2010/047330, filed Aug. 31, 2010, entitled THIMBLE WITH ELEMENT RETAINING FEATURE, by Mike Lindsey, which applications are incorporated herein by reference.

FIELD

This disclosure relates to rigging hardware. More specifically, the disclosure relates to a captivated wire rope sling assembly having a thimble with an element retaining feature.

BACKGROUND

Wire rope has many common industrial uses, such as lifting and hauling operations, towing, and tie-downs. In many of these applications, wire rope is used with rigging hardware, such as wire rope slings. Such slings comprise various wire rope fittings, as well as terminations, which secure the ends of the wire rope to prevent fraying, thus allowing the rope to transmit force. Often, a wire rope sling terminates in a loop, with the loose end being secured back onto the main rope. Fittings, such as clamps, clips, sockets, and swaged fittings are often used to secure the loose end of the rope back onto the rest of the wire rope.

Thimbles are commonly used to preserve the natural shape of the loop. Thimbles serve to prevent the wire rope loop from bending too tightly when loaded, and thus prevent pinching and abrading of the inner surface of the wire rope loop. A shackle is often provided to connect the wire rope loop and thimble to another object, such as an object to be lifted. Together, the wire rope, one or more thimbles, one or more shackles, and one or more other fittings are combined to form a wire rope sling assembly.

Such wire rope slings are often used in heavy duty operations, and thus placed under great stresses and tension when in use. As a result, components of wire rope slings sometimes fail in the field, and users may replace individual components with cheaper or lower quality versions of those components, thus compromising the integrity of the wire rope sling. These practices can subject manufacturers to unwarranted liability. There thus remains a need for an improved wire rope sling assembly and assembly components that do not allow for such unsafe practices in the field.

SUMMARY

The present disclosure provides for an encapsulated or captivated wire rope sling, such that all or some of the components are integral to the sling and cannot be separated without apparent damage to the sling components. Users of some embodiments of a captivated wire rope sling will not be able to replace damaged or failed components without such replacement being apparent upon inspection of the sling. Furthermore, the disclosed captivated wire rope sling allows manufacturers to provide a single wire rope sling assembly, rather than multiple individual components. This also provides the advantage of requiring only one safety certification for the entire assembly, rather than certifying each individual component.

One embodiment of a captivated wire rope sling assembly comprises a length of wire rope having a first end and a second end, wherein a loop is formed in at least one of the first and second ends. The assembly can also comprise a wire rope thimble having first and second leg portions, an arch portion, a peripheral groove extending substantially along an outer surface of the first and second leg portions and the arch portion, an element retaining feature, and a thimble eye defined by an inner surface of the thimble and the element retaining feature. The wire rope loop can be installed in the peripheral groove of the thimble. The assembly can also comprise a rigging element installed through the thimble eye, and the element retaining feature can be secured to one of the first or second leg portions.

In some embodiments, the element retaining feature is welded to the first or second leg portion, such as to the inner surface of either the first or second leg portion. The element retaining feature can be any suitable shape, such as substantially triangular or substantially trapezoidal. The element retaining feature can comprise first and second edges, wherein one of the first or second edges is permanently connected to one of the first or second leg portions and the other of the first or second edges terminates at least in close proximity to the other of the first or second leg portions.

The element retaining feature can comprise a top edge extending between the first and second leg portions, along the thimble eye. The components of some captivated wire rope assemblies can be sized such that the shackle or other rigging element cannot, once the assembly is complete, be removed from the thimble eye without damage to the rigging element, rope and/or thimble. For example, the element retaining feature can be sized relative to the thimble and rigging element such that the thimble eye's largest dimension is defined by the diameter of the thimble arch portion. In this way, the thimble eye does not allow removal of a properly sized rigging element simply by turning the rigging element to different angles. In these embodiments, a diameter defined by the largest distance between the first and second leg portions can be greater than any distance between any point on the top edge of the element retaining feature and any point on the inner surface of the arch portion or first or second leg portions.

The present disclosure also concerns a wire rope thimble that can be used in such captivated wire rope assemblies. One such wire rope thimble comprises a u-shaped member shaped to form a first leg portion, a second leg portion, and an arch portion connecting the first leg portion to the second leg portion, an outer peripheral groove defining a wire rope receiving surface, a thimble eye defined by an inner surface of the thimble, and an element retaining feature coupled to either the first or second leg portion. In some embodiments, the element retaining feature can be welded to either the first or second leg portion.

As described above in conjunction with the wire rope assembly, the element retaining feature can be any suitable shape, such as substantially triangular or trapezoidal. In embodiments with a substantially triangular element retaining feature, the element retaining feature can comprise a first edge substantially parallel to the first leg portion of the thimble, a second edge substantially parallel to the second leg portion of the thimble, and a third edge positioned to extend between the first and second leg portions. In embodiments with a substantially trapezoidal element retaining feature, the element retaining feature can comprise a first edge substantially parallel to the first leg portion of the thimble, a second edge substantially parallel to the second leg portion of the thimble, and a third edge and a fourth edge substantially parallel to one another, wherein the third and fourth edges are positioned relative to the first and second edges to form a substantially trapezoidal shape, and wherein the third edge is adjacent to the of eye of the thimble.

In some embodiments, the element retaining feature is sized relative to the thimble such that a diameter defined by the arch portion is greater than the distance between a first point anywhere along the third edge of the element retaining feature and a second point anywhere along the inner surface of the thimble.

A method for making a captivated wire rope assembly is also disclosed. One such method comprises welding one edge of an element retaining feature to a wire rope thimble, bending a thimble leg away from the element retaining feature to increase the distance between the leg and the element retaining feature, installing a shackle into the thimble eye, bending the thimble leg back towards the element retaining feature such that the shackle is enclosed within the thimble eye, separating a wire rope end into a first and second section, sliding the shackle onto one of the first and second sections, splicing the first and second sections to form a loop, and fitting the loop into a peripheral groove of the thimble. Some methods allow for completion of welding before installation of the wire rope. Welding once the wire rope is in place can damage the rope, and thus it can be advantageous to avoid welding or other high temperature processes once the wire rope is placed on the thimble.

Some methods further comprise installing a ferrule or other device such that the first and second sections are secured back onto the wire rope. Again, the element retaining feature can be any suitable shape, such as substantially triangular or trapezoidal. In some methods, the shackle can be sized such that it cannot be removed from the thimble eye once it has been enclosed in the thimble eye.

The foregoing and other objects, features, and advantages of the invention will become more apparent from the following detailed description, which proceeds with reference to the accompanying figures.

BRIEF DESCRIPTION OF THE DRAWINGS

FIG. 9 is a perspective view of a wire rope loop after being re-woven and passed through a shackle.

FIG. 10 is a perspective view showing a wire rope being installed on a wire rope thimble according to the present disclosure.

DETAILED DESCRIPTION

Rigging assemblies are commonly used in industrial applications such as oil drilling, mining, nuclear energy, energy industries in general, and many others. In many of these applications, safety is of the utmost concern, as rigging equipment is used for, among other things, heavy overhead lifting. Such lifting is often also dynamic in nature, such as moving heavy equipment using a pivoting crane.

The Occupational Safety and Health Administration (OSHA) regulates equipment used in such industries, and requires that manufacturers certify that their parts comply with OSHA requirements. Conventional wire rope sling assemblies typically comprise components such as a wire rope, one or more wire rope thimbles, one or more shackles, one or more clamps, and/or other hardware. Typically, manufacturers are required to certify each component individually because the components are separable from one another, and thus users can often easily replace one component for another in the field. When users substitute a weaker or otherwise inferior component for one that has been damaged or has failed, it puts the whole sling assembly at greater risk for failure, and may subject the manufacturer to undeserved liability.

The present disclosure relates to an integrated or captivated sling assembly that can address some of these issues. Some embodiments of the present captivated wire rope sling provide for an assembly of components that cannot be replaced, switched, or separated easily from one another without apparent damage to the sling. This can allow the manufacturer to obtain only one certification from OSHA covering the entire assembly. It can further prevent the user from replacing one component with an incorrect or unsafe substitute.

Figure 1:
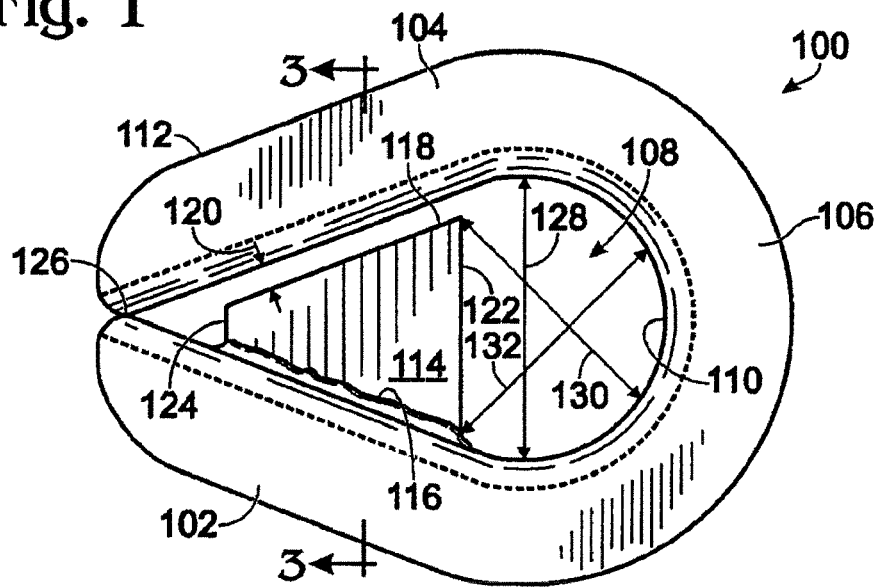
FIG. 1 illustrates a top plan view of one embodiment of a wire rope thimble according to the present disclosure.
Figure 2:
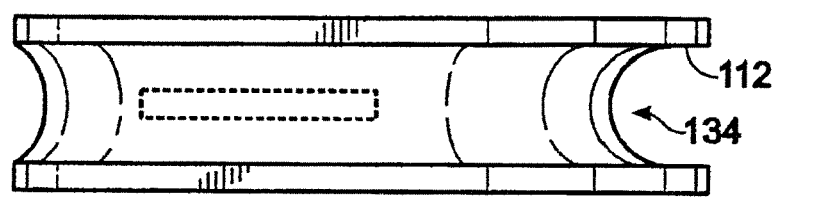
FIG. 2 shows an elevation view of the wire rope thimble of FIG. 1.
Figure 3:
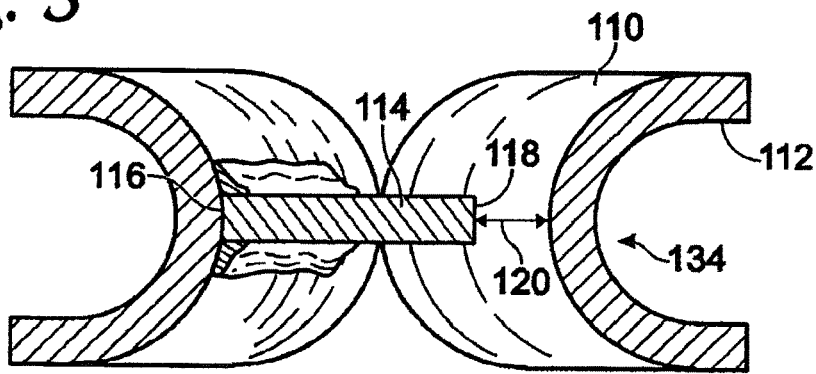
FIG. 3 is a section view taken along line 3-3 in FIG. 1.

FIGS. 1-3 illustrate one embodiment of a wire rope thimble 100 having an element retaining feature according to the present disclosure. FIG. 1 illustrates a top plan view of one embodiment of a wire rope thimble 100 according to the present disclosure. Thimble 100 can be formed of a u-shaped member configured to provide a first leg portion 102, a second leg portion 104, and an arch portion 106, which curves to connect the first leg portion 102 to the second leg portion 104. A thimble eye 108 can be defined by an inner surface 110 of the thimble. Thimble eye 108 allows for attachment of other rigging components to the thimble 100. An outer peripheral surface 112 can be configured to receive a wire rope.

Thimble 100 can also include an element retaining feature 114. Element retaining feature 114 can include a first edge, or side, 116 substantially parallel to the first leg portion 102 of thimble 100. Similarly, element retaining feature 114 can include a second edge, or side, 118 substantially parallel to the second leg portion 104 of thimble 100. In some embodiments, first side 116 is permanently connected to the inner surface 110 of thimble 100 along the first leg portion 102. In some embodiments, second side 118 is permanently connected to the inner surface 110 of thimble 100 along the second leg portion 104. Only one of the first and second sides 116, 118 is permanently connected to the inner surface 110 of thimble 100. Any side of the element retaining feature 114 that is permanently connected to the thimble 100 can be so connected in any way that is not easily detachable. For example, a permanently connected element retaining feature usually cannot be broken off of the thimble without some damage to the integrity of the thimble. In some embodiments, one or more sides of the element retaining feature are welded to the thimble 100. Thus, a torch or cutting would be required to remove the element retaining feature.

In alternate embodiments, the element retaining feature 114 can be secured to the thimble 100 in a non-permanent manner. For example, the element retaining feature 114 can be releasably secured to the thimble 100, such as by an adhesive, pins, screws, magnets, or any other releasable connection.

The second side 118, which, in FIG. 1, is not permanently connected to the thimble, can terminate at least in close proximity to thimble leg 104. In some embodiments, there can be a space or gap 120 between the free side (e.g., second side 118) of the element retaining feature 114 and the inner surface 110 of thimble 100. The second side 118 can be said to be in close proximity to thimble leg 104 if the gap 120 is small relative to the diameter of the wire rope. Gap 120 may be visible with the unaided eye in some embodiments, or so small in other embodiments that it appears that there is no gap. In some embodiments, the free side of element retaining feature 114 in fact contacts the inner surface 110 of thimble 100, but nonetheless is not secured or otherwise adhered or coupled to the inner surface 110.

Element retaining feature 114 can be substantially triangular in some embodiments and can include a third edge, or side, 122 facing and adjacent to the thimble eye 108. In other embodiments, element retaining feature 114 can be substantially trapezoidal and can include a third side 122 facing and adjacent to the thimble eye 108, as well as a fourth side 124 substantially parallel to the third side 122. In these and other embodiments, and as shown in FIG. 1, the third side 122 can extend between the first and second leg portions 102, 104 of thimble 100. Regardless of the shape of the element retaining feature 114, the third side 122 of the element retaining feature 114 can help define the thimble eye 108, along with the inner surface 110 of the thimble 100.

In the embodiment shown in FIG. 1, the element retaining feature 114 terminates at its fourth side 124, which is displaced from a thimble vertex 126. The thimble vertex 126 is located at the termination of the thimble leg portions 102, 104, opposite the arch portion 106. In other embodiments, the element retaining feature 114 can extend to or substantially meet the thimble vertex 126. As seen in FIG. 1, the element retaining feature 114 can substantially fill a space between the thimble eye 108 and the vertex 126. In some embodiments, the element retaining feature 114 can fill the majority (e.g., greater than 50%) of a space between the first and second leg portions 102, 104.

Element retaining feature 114 can be sized relative to the thimble 100 such that the length of the widest part of the thimble eye 108 is greater than the distance from any point on the third side 122 of the element retaining feature 114 to any point on the inner surface 110 of thimble 100. For example, the diameter 128 of the imaginary circle which forms the arch portion 106 can be designed to be greater than any distance 130, 132 from the side 122 to the inner surface 110. In some embodiments, this can ensure that any elements placed through the thimble eye 108, such as a shackle, cannot be removed or separated from the thimble 100 without damage or destruction to one or more of the assembly components.

Element retaining feature 114 can be provided with any suitable coatings, platings, engravings, pigments, or the like, to meet any requirements of the users. In some embodiments, the element retaining feature can include a bumper layer, such as a rubber bumper on some or all surfaces of the element retaining feature. For example, in one embodiment, the element retaining feature can include a rubber bumper along its top edge (e.g., third side 122), adjacent the thimble eye 108.

While the element retaining feature 114 shown in FIG. 1 includes one triangular gusset or flange, other embodiments of a thimble 100 according to the present disclosure may be provided with element retaining features of different shapes. For example, element retaining features can be substantially square, rectangular, circular, oval, trapezoidal, or diamond shaped. Furthermore, a thimble can be provided with more than one element retaining feature. For example, in one embodiment, the element retaining feature can be split into two triangular pieces, each with one side welded to one leg of the thimble. The thimble can still be bent open for placement of the shackle, and once closed together, the two triangular pieces can be welded together, or simply remain close to or in contact with one another.

FIG. 2 shows an elevation view of the wire rope thimble of FIG. 1. FIG. 3 is a section view taken along line 3-3 in FIG. 1. As seen in FIGS. 2 and 3, an outer peripheral groove 134 is provided around the length of thimble 100 and is defined by the outer peripheral surface 112. Peripheral groove 134 serves as a wire rope receiving surface that contacts a loop of wire rope at one end of the rope. In this way, the thimble 100 can be secured to the rope such that the wire rope conforms to the shape of the thimble. Thimble 100 can thus limit the degree to which the wire rope will be bent or pinched when force is applied to the rope loop (e.g., when tension is applied to the rope). Thimble 100 adds protection and reinforcement to the inner surface of the rope, preventing fraying and abrasions of the wire rope.

The thimble 100 can include any suitable material or combination of materials. For example, in some embodiments, the thimble can include stainless steel, galvanized steel, extra improved plow steel, AISI 1008 steel, or any other suitable material or combination of materials. In some embodiments, the thimble can be plated with zinc or other material.

The thimble 100 can also be provided in a range of different sizes, to accommodate different sizes of wire rope. For example, thimble 100 can be sized to accommodate wire rope with a diameter of from about ⅜ inches or smaller to about 3.5 inches or larger. Specific embodiments of a captivated wire rope assembly can be designed for wire rope having a diameter of about ⅜, 7/16, ½, 9/16, ⅝, ¾, ⅞, 1, 1 ⅛, 1¼, 1⅜, 1.5 inches, or larger. Specific wire rope diameters not mentioned can be designed for as well by simply modifying the dimensions of the thimble and other assembly components, as necessary. In some embodiments, the diameter of the outer peripheral groove can be slightly larger than the diameter of rope to be placed in the thimble. Specific embodiments of suitable wire rope thimbles can range in length from about 2.5 inches to about 10 inches, and can range in width from about 2 inches to about 7.25 inches. Of course, smaller and larger thimbles are also suitable in some embodiments.

Figure 4:
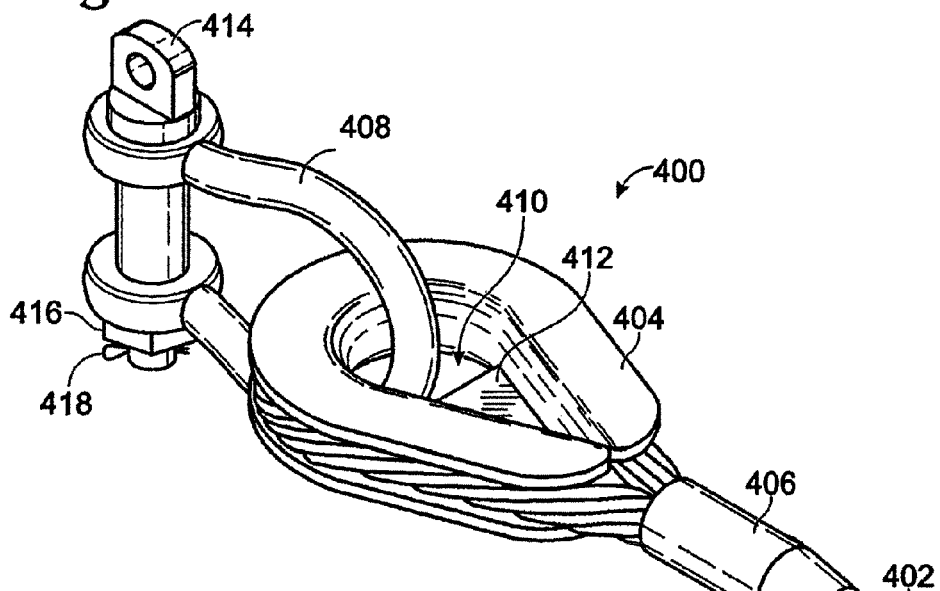
FIG. 4 is a perspective view of one embodiment of a captivated wire rope assembly according to the present disclosure.

A thimble with one or more element retaining features can be used in conjunction with other rigging hardware and components to form a captivated wire rope assembly. FIG. 4 is a perspective view of one embodiment of a captivated wire rope assembly 400 according to the present disclosure. As seen in FIG. 4, the captivated wire rope assembly 400 can include a wire rope 402 wrapped around a thimble 404. A ferrule capsule 406 can hold the ends of the wire rope 402 so that the rope 402 does not loosen and fall off of the thimble 404. A shackle 408 can be placed through the thimble eye 410, and an element retaining feature 412 can be provided on the thimble 404. In some embodiments, the element retaining feature can add strength to the thimble and/or help retain the shackle 408 or any other rigging element within the thimble eye 410.

Shackle 408 is shown as a bolt type shackle, with bolt 414 secured with nut 416 and pin 418. FIG. 4 is not meant to be limiting, as any type of rigging element can be installed through thimble eye 410. For example, other types of shackles, including round pin and screw pin shackles, can all be part of a captivated wire rope assembly according to the present disclosure.

Furthermore, captivated wire rope assembly 400 can be provided as one end of a wire rope sling. Any termination can be used for the other end of the sling, including an identical or different captivated wire rope assembly. In other embodiments, a wire rope sling can be provided with a captivated wire rope assembly on one end, and a standard eye, conventional thimble, open or closed swage socket, hook, slip-thru thimble, crescent thimble, or other device on the other end.

Thimbles with element retaining features can be made by modifying a conventional wire rope thimble. For example, the legs of a wire rope thimble can be pried apart, and one side of an element retaining feature can be welded to or otherwise permanently connected to the inner surface of one of the thimble legs. Alternatively, an element retaining feature can be welded or otherwise permanently connected to a wire rope thimble in the standard configuration (e.g., with the thimble legs in close proximity to one another, not pried apart). The thimble with an element retaining feature can be galvanized before being combined with other components to form a captivated wire rope assembly.

Figure 5:
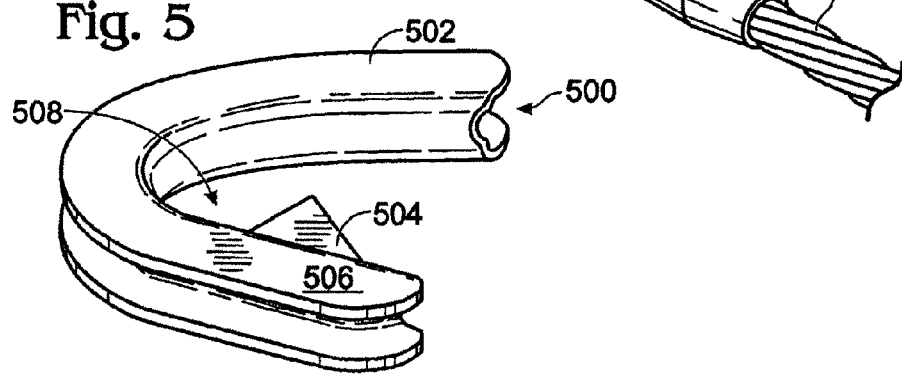
FIG. 5 is a perspective view of one embodiment of a wire rope thimble bent open to accommodate a shackle according to one embodiment of a method for making a wire rope assembly.

A thimble having an element retaining feature can be used to make a captivated wire rope assembly. FIG. 5 is a perspective view of one embodiment of a wire rope thimble 500 bent or pried open to accommodate a shackle according to one embodiment of a method for making a wire rope assembly. Any method and tools can be used to separate one leg 502 of the thimble from the element retaining feature 504 as shown in FIG. 5. Typically, a substantial force and specialized tooling, such as a press, is necessary to separate the thimble legs, making it difficult to pry apart the legs in the field.

Figure 6:
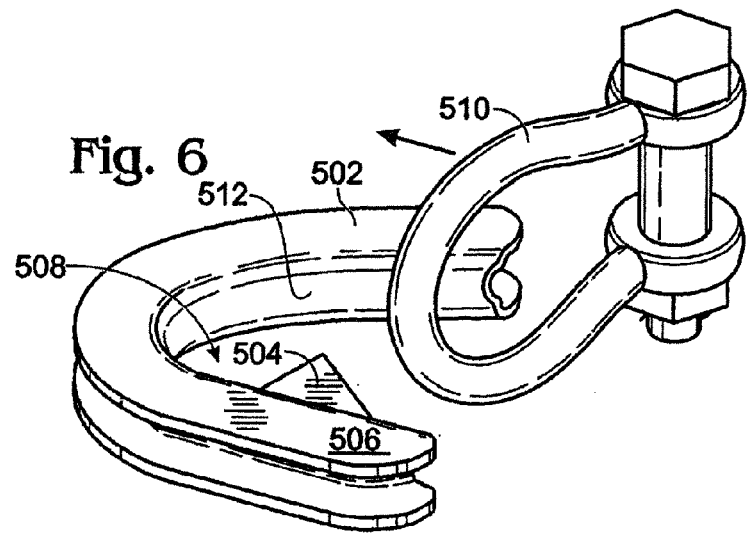
FIG. 6 is perspective view of the wire rope thimble of FIG. 5, after placement of a shackle on the wire rope thimble.

In one method, the thimble leg 506 welded to the element retaining feature 504 can be secured in a vise, while a wrench or other tool is used to pry the opposite thimble leg 502 away, at an angle from the element retaining feature 504. This can allow for a shackle 510 or other rigging element to be placed through the thimble eye 508 and onto a thimble leg, as shown in FIG. 6. In some embodiments, one thimble leg is pulled or pushed away from the other thimble leg, both transversely and in a direction out of the plane defined by the thimble. More preferably, a first thimble leg is pulled or pushed away from the second thimble leg strictly by bending or twisting the first thimble leg out of the plane defined by the thimble. Thus, in some embodiments, the two thimble legs are not displaced laterally from one another in order to accommodate a rigging element, but rather, are forced out of alignment vertically with one another to create space for a rigging element to be placed on the thimble.

Bending the thimble leg 502 away from the element retaining feature 504 can provide enough room to slide shackle 510 along thimble leg 502, to rest within the thimble eye 508. One advantage of this embodiment is that several different sizes of shackles 510 can be installed on the thimble 500 without requiring any design changes to the thimble 500. With conventional wire rope thimbles, if a user requires a different shackle than is customarily provided with a particular thimble size, the manufacturer has to custom-make a different thimble to accommodate the larger shackle. The presently disclosed thimbles can allow for more flexibility, as more than one size of shackle or other rigging element can be placed on the thimble.

Once the shackle 510 or other rigging element is in place within the thimble eye 508, the thimble leg 502 can be bent back into its original configuration, thus enclosing the shackle 510 within the thimble eye 508. The thimble leg 502 can be replaced to its original configuration by any suitable method, such as by using a vise and wrench again to bend the thimble leg 502 substantially back into alignment with thimble leg 506. Once thimble leg 502 has been bent back into place, the inner surface 512 of thimble leg 502 can contact the element retaining feature 504. In other embodiments, the inner surface 512 of thimble leg 502 can be near, but not touching, the element retaining feature 504. In still other embodiments, the inner surface 512 of the thimble leg 502 can be in contact with a portion of the element retaining feature 504, while separated some distance from other portions of the element retaining feature 504.

In some embodiments, once the thimble leg 502 is bent substantially back into alignment with the thimble leg 506, the shackle 510 (or other rigging element) is trapped within the thimble eye 508. In these embodiments, with the element retaining feature 504 in place, the thimble eye 508 is too small to allow for removal of the shackle 510 because the largest part of the shackle 510 is wider than the widest dimension of the thimble eye 508. Some disclosed methods can provide an advantage over conventional wire rope thimbles in that no welding is required once the wire rope has been installed on the thimble. Excessive heat from welding can damage the wire rope. In some embodiments, the element retaining feature can be welded to the thimble before placement of the wire rope, thus preserving the integrity of the wire rope once it is installed.

Figure 7:
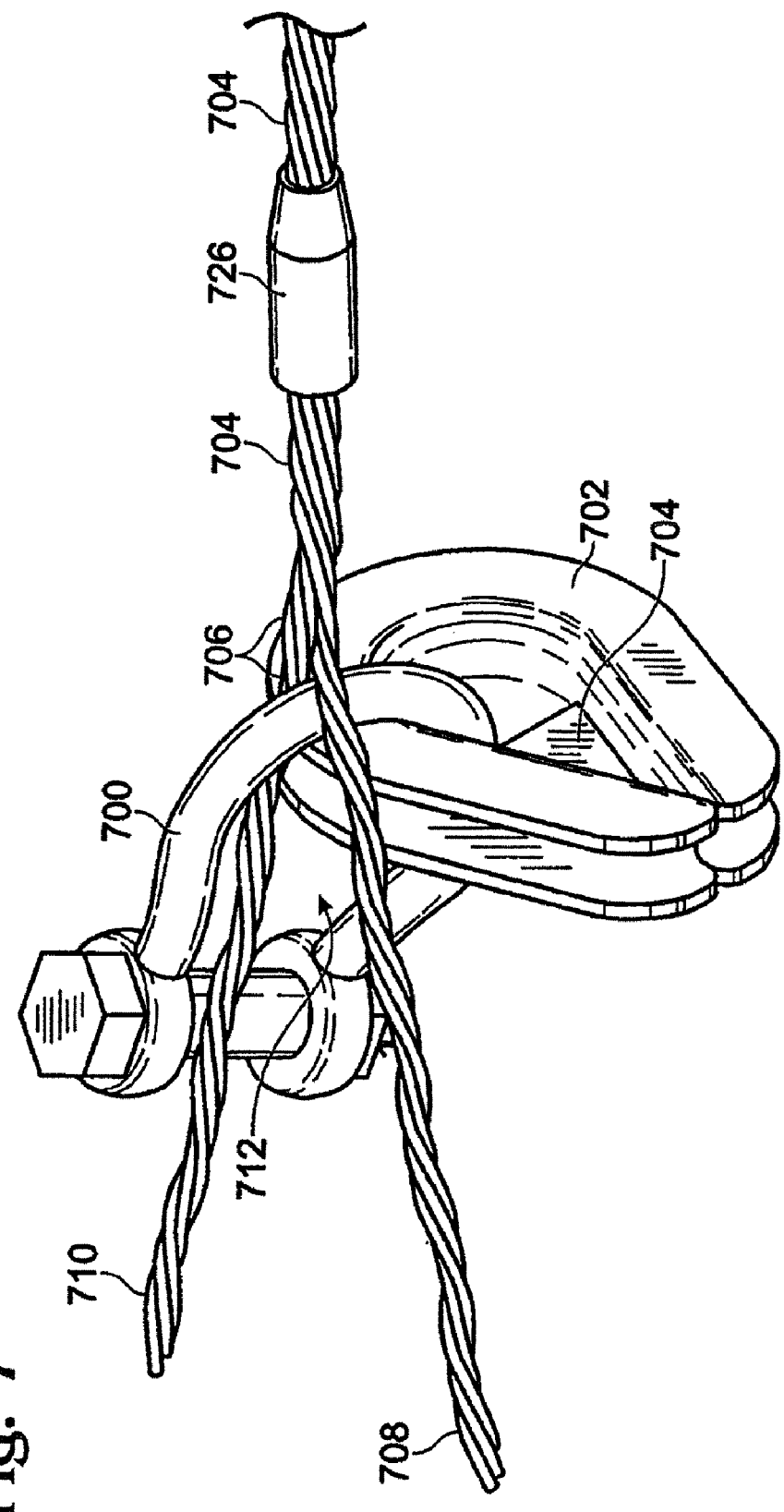
FIG. 7 is a perspective view showing a shackle and wire rope thimble being placed on a split wire rope.

Once a shackle or other rigging element is secured within the thimble eye, a wire rope can be installed on the thimble, in the outer peripheral groove. As seen in FIG. 7, a shackle 700 is secured to a thimble 702. A wire rope 704 includes many bundles 706 of individual strands of wires. An end of the wire rope 704 can be split into halves 708, 710, with each half 708, 710 comprising a plurality of bundles 706. Wire rope 704 can be split into substantially equal halves 708, 710. In other embodiments, the halves 708, 710 can be unevenly split, with one half being bigger than the other. As seen in FIG. 7, the wire rope 704 need not be split along its entire length (i.e., it need not be split into two completely separate pieces). Instead, only a portion of the wire rope 704 can be split, starting at one end, leaving some of the main body of the wire rope intact.

In one method, the shackle 700 is slid onto one of the wire rope halves 708, such that all the bundles 706 of the wire rope half 708 pass through the opening 712 of the shackle 700.

Figure 8:
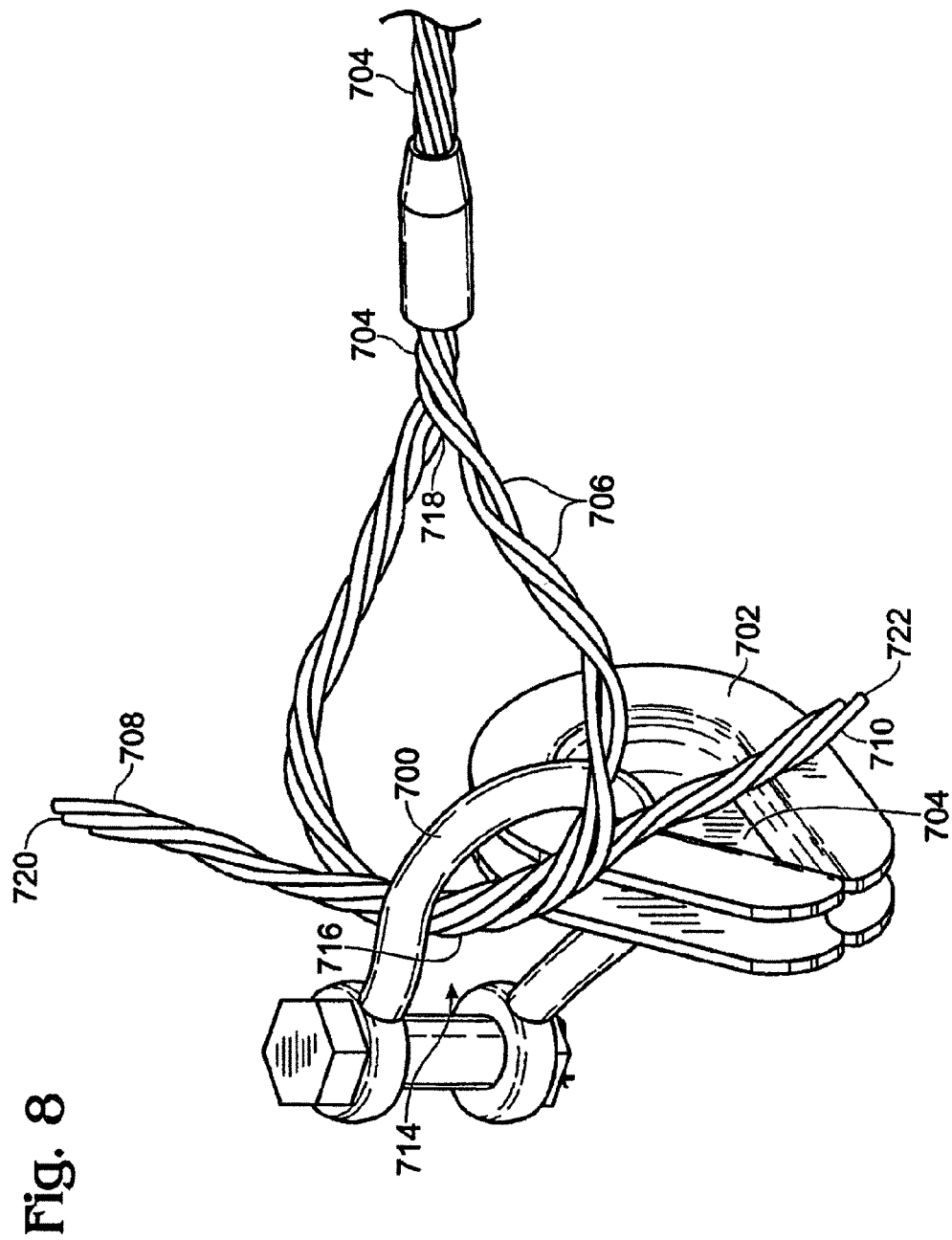
FIG. 8 is a perspective view showing a split wire rope in the midst of being re-woven, according to one method of making a wire rope assembly.

As seen in FIG. 8, the two wire rope halves 708, 710 can be passed by one another and rewoven, braided, and/or twisted around one another to form a loop 714 of wire rope enclosing the shackle 700. Essentially, a right hand loop can be started with wire rope half 708 and a left hand loop can be started with wire rope half 710. Reweaving the wire rope halves 708, 710 back together can include interweaving individual wire rope bundles 706 in any suitable fashion. In some methods, reweaving the wire rope halves 708, 710 back together can include twisting groups of bundles 706 around each other to reform the wire rope. In one method, reweaving can be initiated at the top 716 of the loop 714, opposite the split 718 in wire rope 704. In this method, reweaving continues along each of the wire rope halves 708, 710 towards their ends 720, 722, respectively. One method for forming a loop of wire rope by reweaving two halves of rope is disclosed in U.S. Pat. No. 4,215,463, the entirety of which is herein incorporated by reference.

FIG. 9 is a perspective view of the wire rope loop 714 of FIG. 8 after completion of intertwining the wire rope halves 708, 710 together to form a braided or woven loop in the end of wire rope 704. The ends 720, 722 of the wire rope halves meet at or near the location of the original split 718 in the wire rope 704.

FIG. 10 shows installation of the wire rope loop 714 into the outer peripheral groove 724 of the thimble 702. Tooling such as vises can help ensure a proper fit between the wire rope loop 714 and the thimble 702, as is well understood in the art, although typically it is not necessary to force the woven rope loop 714 into the groove 724.

At any point once the two halves of wire rope have been rewoven or spliced back together to form a complete wire rope loop, a ferrule 726 can be secured over wire rope ends 720, 722 to hold them in place at the main body of wire rope 704. One example of a ferrule 406 is shown in FIG. 4 as part of one embodiment of a captivated wire rope assembly. Other hardware can also be used to secure the ends of the wire rope loop after reweaving. For example, in some embodiments, wire rope clamps, clips, wedged or poured sockets, sleeves, and/or threaded studs can be used to secure the loose ends of the loop back onto the wire rope. The ferrule can be positioned appropriately over the ends of the wire rope once the eye or loop has been formed, and crimped or pressed to secure the wire rope loop in place on the thimble. In some embodiments, the ferrule is placed on the wire rope before any terminations are formed (e.g., before the loops are formed and/or before any rigging hardware is secured to the wire rope). For many applications it is desirable to, in effect, permanently secure the wire rope assembly to the thimble by crimping or swaging the ferrule or similar element in place such that the wire rope loop, shackle and thimble cannot be separated from one another without conspicuously damaging the integrity of the captivated assembly by cutting, blow torching, melting, distorting or otherwise damaging one or more of the assembly components.

Figure 11:
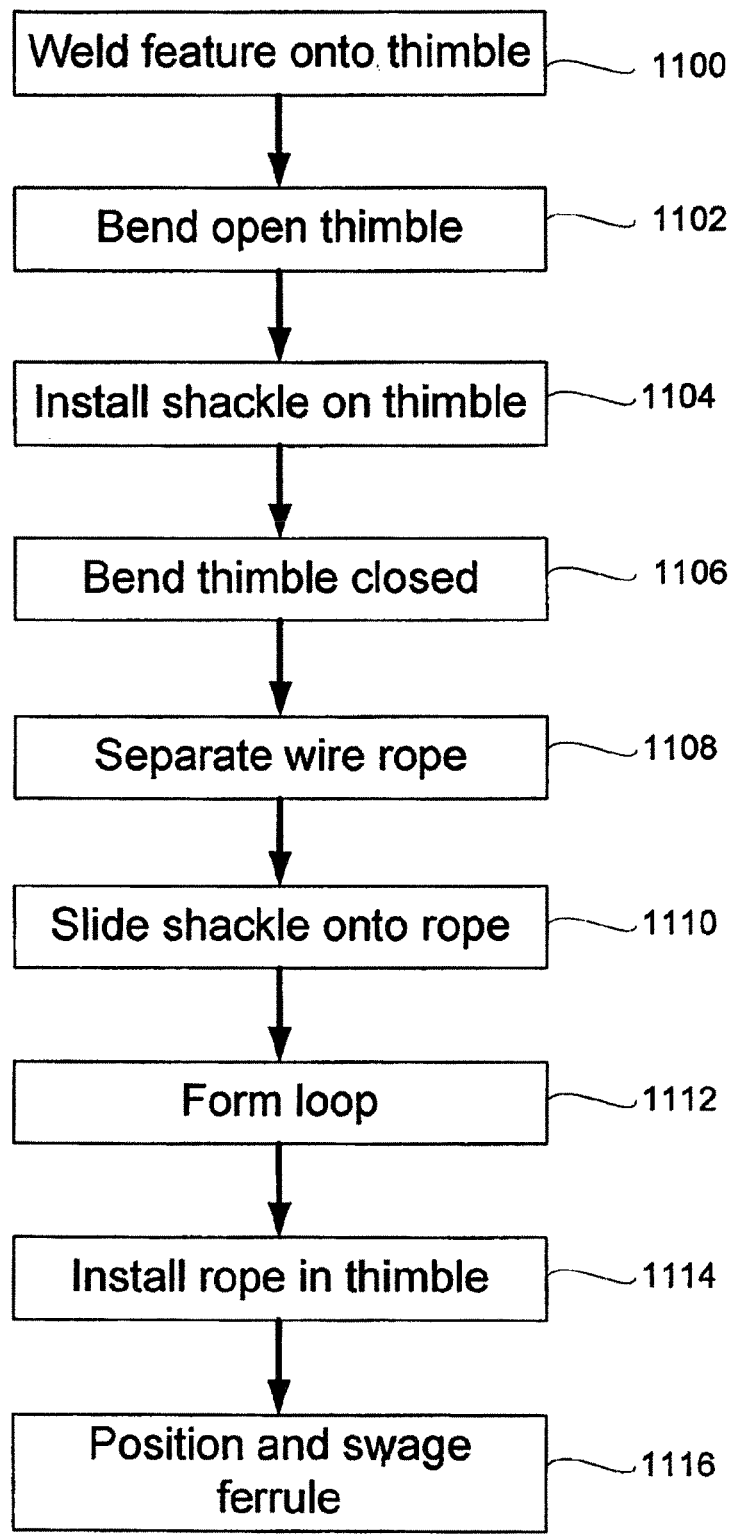
FIG. 11 is a block diagram illustrating one embodiment of a method for making a wire rope assembly according to the present disclosure.

FIG. 11 is a block diagram illustrating one embodiment of a method for making a wire rope assembly according to the present disclosure. An element retaining feature, such as a triangular flange or gusset can be welded along one of its sides to one leg of a wire rope thimble (step 1100). The wire rope thimble and element retaining feature can be galvanized. The thimble can then be forced or bent open, to separate the free thimble leg from the leg welded to the element retaining feature (step 1102). Preferably, the free thimble leg is pried away in a twisting manner, such that the free thimble leg is bent out of the plane defined by the thimble, as distinguished from pulling the legs laterally apart.

In an alternate embodiment, the thimble can be bent open before the element retaining feature is welded in place. Bending the free thimble leg open can create enough space to slide a shackle or other rigging element onto the free thimble leg, and into place within the thimble eye (step 1104). Without bending open the thimble, the element retaining feature can make it impossible to install a properly sized shackle on the thimble.

Once the rigging element (e.g., the shackle) is in place in the thimble eye, the shackle can sealed within the thimble eye. For example, the thimble can be closed, or bent back into its original configuration, with the free thimble leg once again substantially aligning with the thimble leg welded to the element retaining feature (step 1106). Once closed, one edge of the element retaining feature can terminate at least in close proximity to the inner surface of the free thimble leg, and preferably in contact with the free leg. Closing the thimble, just as opening the thimble, can be performed in any suitable way. In one method, the thimble is secured in a vise, and a wrench can be used to bend open the free thimble leg, and then close it.

At any point in the method, a wire rope can be separated into two halves, or groups of bundles, along at least part of its length (step 1108). This can result in the wire rope branching into two halves, each half having an end. A shackle and thimble combination can be slid onto one of the half ends, such that one of the wire rope halves passes through the shackle opening, and the other wire rope half does not (step 1110). The two halves of wire rope can then be crossed over one another (e.g., one half forms a right hand loop, and the other forms a left hand loop) and rewoven or twisted together to form a loop of wire rope over the shackle and thimble combination (step 1112).

The wire rope loop can be placed into the outer peripheral groove of the thimble (step 1114), and a ferrule or other hardware can be applied to secure the loose ends of the loop back onto the original wire rope (step 1116). In some embodiments, the ferrule or sleeve has already been placed on the main body of the wire rope and just needs to be slid or knocked into a position suitable to secure the loop. For example, in one embodiment, cylindrical ferrules can be swaged around the peripheral surface of the wire rope in order to secure the loose ends back onto the original rope body and create a captivated construction.

Some of the disclosed methods require no welding after the wire rope has been placed on the thimble. This feature can be advantageous because once the rope is in place, any welding done on the assembly can damage the strength and integrity of the rope, shackle, and other components of the assembly. Because the element retaining feature or features are not permanently connected on all sides, or to both thimble legs in some embodiments, the thimble can be bent open for shackle placement, and bent closed to trap the shackle in the thimble eye, without having to weld anything else to keep it secure.

Conventional reinforced thimbles with pieces welded on both thimble legs have further disadvantages as well. For example, suitable shackle sizes are limited for each thimble, because the shackle must be placed on after welding, and therefore it has to fit through the thimble eye. Thus, the shackle would be removable and replaceable in the field, destroying the integrity of the assembly. Such a removable shackle is not traceable with the rest of the assembly, and would require additional safety certifications for each assembly component.

The disclosed captivated wire rope assembly can allow manufacturers to provide the shackle or other rigging element as part of an assembly, or sling, and not allow shackle replacement or substitution in the field. In some embodiments, the wire rope cannot be removed from the thimble placed into the thimble peripheral groove, without damaging the rope itself or other components of the captivated wire rope assembly. In some embodiments, once the wire rope has been spliced and clamped, such as with a ferrule, it is impossible to remove the rope from the thimble without visible damage to the rope and/or assembly components. This can further ensure that users will not separate the components of the captivated wire rope assembly, thus allowing manufacturers to trace entire assemblies instead of dealing with individual components.

The disclosed captivated wire rope assembly can also allow more flexibility in the size of shackle placed on by the manufacturer. Some conventional reinforced thimbles are provided with a bar welded to both legs of the thimble. A custom thimble would be required if the user needed a larger than typical shackle for a particular rope or thimble size. The captivated wire rope sling of the present disclosure allows more flexibility, in that a larger shackle can be provided by the manufacturer without requiring any change or custom modification to the thimble or other components of the captivated sling assembly.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A thimble assembly, comprising:
a length of wire rope having a first end and a second end, wherein a loop is formed in at least one of the first and second ends;
a wire rope thimble, the thimble comprising first and second leg portions, an arch portion, a peripheral groove extending substantially along an outer surface of the first and second leg portions and the arch portion, an element retaining feature, and a thimble eye defined by an inner surface of the thimble and the element retaining feature, wherein the wire rope loop is installed in the peripheral groove; and
a rigging element installed through the thimble eye,
wherein the element retaining feature is secured to one of the first or second leg portions and disconnected from the other of the first or second leg portion, the element retaining feature including a plate that cooperates with the first and second leg portions and arch portion to fully enclose and encapsulate the rigging element within the thimble eye, the element retaining feature filling a majority of a space between the first and second leg portions such that a largest part of the rigging element is wider than the widest dimension of the thimble eye.

2. The thimble assembly of claim 1, wherein the element retaining feature is welded to one of the first or second leg portions.

3. The thimble assembly of claim 1, wherein the element retaining feature is welded to the inner surface of the thimble on one of the first or second leg portions.

4. The thimble assembly of claim 1, wherein the element retaining feature comprises first and second edges, wherein one of the first or second edges is permanently connected to one of the first or second leg portions, and the other of the first or second edges terminates short of the other of the first or second leg portions to define a gap, the gap being smaller than a diameter of the rigging element.

5. The thimble assembly of claim 1, wherein the element retaining feature is substantially triangular.

6. The thimble assembly of claim 1, wherein the element retaining feature is substantially trapezoidal.

7. The thimble assembly of claim 1, wherein the first and second leg portions terminate at a vertex opposite the arch portion.

8. The thimble assembly of claim 1, wherein the element retaining feature comprises a top edge extending between the first and second leg portions, along the thimble eye.

9. The thimble assembly of claim 1, wherein a diameter defined by the largest distance between the first and second leg portions is greater than any distance between any point on a top edge of the element retaining feature and any point on the inner surface of the arch portion.

10. A thimble assembly comprising:
a length of wire rope having a first end and a second end, wherein a loop is formed in at least one of the first and second ends;
a wire rope thimble, the thimble including first and second leg portions, an arch portion therebetween, a peripheral groove extending substantially along an outer surface of the first and second leg portions, an element retaining plate that fills a majority of the space between the first and second leg portions, and a fully enclosed thimble eye defined by an inner surface of the thimble and element retaining plate, wherein the wire rope is installed in the peripheral groove and swedged onto the thimble; and
a rigging element installed through the thimble eye, and having at least one enlarged portion incapable of passing through the thimble eye,
wherein the element retaining plate is secured to one of the first and second leg portions and disconnected from the other of the first and second leg portions, the thimble, element retaining plate and swedged wire rope creating a captivated assembly wherein the rigging element and wire rope cannot be separated from the thimble without harming the integrity of the thimble assembly.

* * * * *